ively as goo# UNITED STATES PATENT OFFICE.

JAMES W. SALLADE, OF POTTSVILLE, PENNSYLVANIA.

DETERGENT COMPOSITION AND PROCESS OF MAKING SAME.

SPECIFICATION forming part of Letters Patent No. 607,663, dated July 19, 1898.

Application filed October 12, 1897. Serial No. 655,005. (No specimens.)

*To all whom it may concern:*

Be it known that I, JAMES W. SALLADE, a citizen of the United States, residing at Pottsville, in the county of Schuylkill and State of Pennsylvania, have invented a new and useful composition of matter and process of making the same to be used for laundry purposes, for removing grease and stains of all kinds, and for general cleansing purposes, also a perfect germicide and insecticide, destroying germs and microbes and killing lice and other parasites, of which the following is a specification.

My composition consists of the following ingredients, combined in substantially the proportions stated—viz., Labarraque's solution of chlorinated soda, twelve parts; water of ammonia, (*United States Pharmacopœia,*) 20° strong, six parts; biborate of soda, (*United States Pharmacopœia,*) two parts; distilled water, eighty parts; total, one hundred parts.

In preparing my composition I proceed as follows: I dissolve the biborate of soda in the eighty parts of water, add the water of ammonia, and lastly the solution of chlorinated soda, then bottle; or it will be equally as good to mix the biborate of soda with the water, then add the Labarraque's solution of chlorinated soda, and add the ammonia lastly.

In using the above-named liquid composition a five-per-cent. to fifteen-per-cent. solution in cold or tepid water answers all ordinary purposes, and a weaker solution answers very well in many cases. It possesses detergent, antiseptic, and disinfectant properties.

What I claim, and desire to secure by Letters Patent of the United States, is—

1. The herein-described disinfecting and detergent composition consisting of Labarraque's solution of chlorinated soda, biborate of soda and ammonia in substantially the proportions specified.

2. The process of making a detergent and disinfecting solution which consists in mixing a solution of borax and ammonia finally adding Labarraque's solution of chlorinated soda substantially as described.

JAMES W. SALLADE.

Witnesses:
W. L. KRAMER,
I. A. REED.